US 8,511,620 B2

(12) United States Patent
Matsuda

(10) Patent No.: US 8,511,620 B2
(45) Date of Patent: Aug. 20, 2013

(54) AIRCRAFT WING LOAD ALLEVIATION SYSTEM

(75) Inventor: Yukitaka Matsuda, Bristol (GB)

(73) Assignee: Airbus Operations Limited, Bristol (GB)

( * ) Notice: Subject to any disclaimer, the term of this patent is extended or adjusted under 35 U.S.C. 154(b) by 221 days.

(21) Appl. No.: 13/138,162

(22) PCT Filed: Feb. 16, 2010

(86) PCT No.: PCT/GB2010/050253
§ 371 (c)(1),
(2), (4) Date: Jul. 14, 2011

(87) PCT Pub. No.: WO2010/094952
PCT Pub. Date: Aug. 26, 2010

(65) Prior Publication Data
US 2011/0272532 A1    Nov. 10, 2011

(30) Foreign Application Priority Data

Feb. 18, 2009  (GB) .................................. 0902685.7

(51) Int. Cl.
*B64C 3/50* (2006.01)
(52) U.S. Cl.
USPC ............................ 244/215; 244/214; 244/217
(58) Field of Classification Search
None
See application file for complete search history.

(56) References Cited

U.S. PATENT DOCUMENTS

| | | | |
|---|---|---|---|
| 2,011,902 A | 8/1935 | Leigh | |
| 3,628,756 A * | 12/1971 | Johnson | 244/213 |
| 2007/0114327 A1 * | 5/2007 | Dees et al. | 244/34 R |
| 2009/0008506 A1 * | 1/2009 | Dodd et al. | 244/214 |
| 2009/0200431 A1 * | 8/2009 | Konings et al. | 244/213 |
| 2010/0286849 A1 * | 11/2010 | Huynh et al. | 701/4 |
| 2010/0320332 A1 * | 12/2010 | Voss et al. | 244/217 |

FOREIGN PATENT DOCUMENTS

| | | |
|---|---|---|
| EP | 0 127 963 | 12/1984 |
| GB | 562365 | 6/1944 |
| GB | 562371 | 6/1944 |
| GB | 563319 | 8/1944 |
| GB | 563433 | 8/1944 |
| GB | 581876 | 10/1946 |

OTHER PUBLICATIONS

UK Search Report dated Jun. 8, 2009 in GB 0902685.7.
International Search Report and the Written Opinion of the International Searching Authority mailed Aug. 11, 2010 in PCT/GB2010/050253.

* cited by examiner

*Primary Examiner* — Christopher P Ellis
*Assistant Examiner* — Medhat Badawi
(74) *Attorney, Agent, or Firm* — Nixon & Vanderhye P.C.

(57) ABSTRACT

An aircraft wing load alleviation system incorporating a wing, a spoiler panel (14), a device (16, 17) which restricts circulation of air around a trailing edge of the spoiler and a control system. The spoiler panel is pivotally attached to the wing so that the spoiler panel can be rotated up from a lowered position to a raised position, thereby opening a void between the spoiler panel and the wing. The retractable device can be deployed from a retracted position to an extended position in which it restricts circulation of air around the trailing edge of the spoiler panel and into the void, thus reducing induced drag. The control system is configured to detect or predict an increase in the lift of the wing and rotate the spoiler panel to its raised position in response to a detected or predicted increase in the lift of the wing.

16 Claims, 6 Drawing Sheets

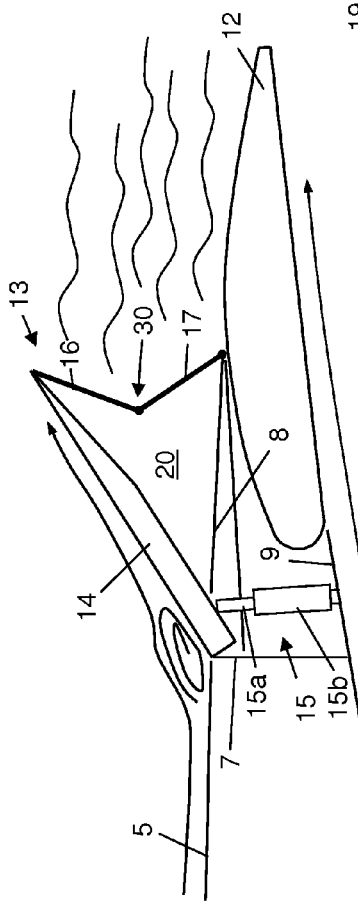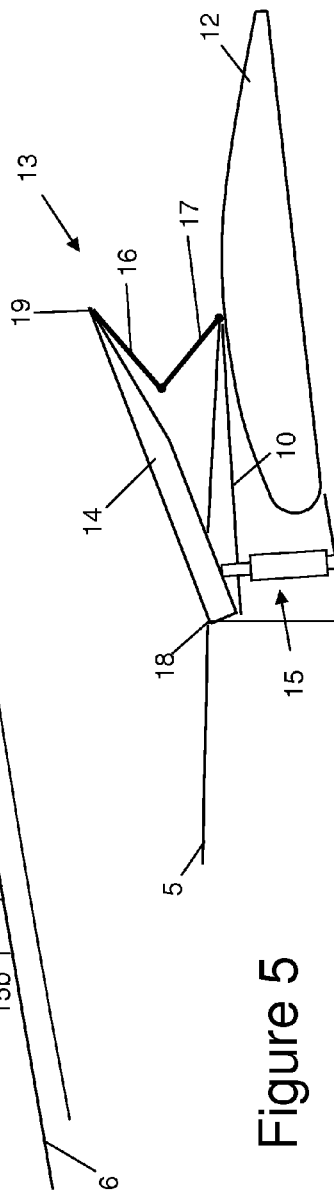

AIRCRAFT WING LOAD ALLEVIATION SYSTEM

This application is the U.S. national phase of International Application No. PCT/GB2010/050253 filed 16 Feb. 2010 which designated the U.S. and claims priority to GB Application No. 0902685.7 filed 18 Feb. 2009, the entire contents of each of which are hereby incorporated by reference.

FIELD OF THE INVENTION

The present invention relates to an aircraft wing load alleviation system, and an associated method.

BACKGROUND OF THE INVENTION

A spoiler is typically a panel hinged to the upper surface of a wing. Conventionally an array of such spoilers is provided for failsafe purposes. That is, each spoiler is controlled by an independent actuator so that, if one of the actuators fails, the remaining spoilers can still be deployed. The individual spoilers are closely spaced with ideally no gap between the spoilers. Generally, each spoiler is made from solid material such as metal or composite. Between the spoilers in a span-wise sense, solid rubber seals are used to prevent the leakage of airflow while the spoilers are retracted.

The primary function of the spoiler is to reduce lift of the wing, although a secondary effect of the spoiler is to slightly increase the drag of the wing. The drag increase is partially caused by the increase of frontal area due to the deployment of the spoiler.

By way of illustration, an aircraft wing shown in FIG. 1 has an upper surface 1; and a line of spoilers including a relatively large inboard spoiler 2 (oriented at right angles to the aircraft's direction of flight 4) and four relatively small outboard spoilers 3 (which are swept back relative to the aircraft's direction of flight 4).

The spoilers 2,3 are pivotally attached to the upper surface 1, and each is controlled by an independent actuator which can pivot the spoiler up into a deployed position, and down into an inoperative position in which the spoiler lies flush with the upper surface 1.

FIG. 2 shows the flow field for the aircraft wing with the conventional spoiler in its retracted position.

FIG. 3 shows the flow field associated with the aircraft wing with the conventional spoiler in its deployed position. The flow behind the spoiler is fully separated and completely turbulent. This turbulent flow generates large induced drag.

The spoilers may be deployed during landing approach and/or during landing. In such cases the drag introduced by the spoilers is not a problem. However, the spoilers may also be deployed during a cruise flight phase for purposes of load alleviation. For example, when an aircraft performs a manoeuvre such as a turn, or the aircraft wing is subject to a gust of wind, causing the lift of the aircraft wing(s) to increase, one or more of the spoilers can be deployed to minimise the increase in lift and the subsequent increase in the bending moment at the root of the wing where it meets the fuselage. However, the increase in drag induced by the deployed spoilers is not desirable when they are used for load alleviation. It is therefore desirable to reduce the drag induced by a deployed spoiler when it is deployed for the purpose of load alleviation.

SUMMARY OF THE INVENTION

A first aspect of the invention provides an aircraft wing load alleviation system comprising:

a wing;
a spoiler assembly comprising:
 a spoiler panel having a trailing edge, the spoiler panel being pivotally attached to the wing so that the spoiler panel can be rotated up from a lowered position to a raised position, thereby opening a void between the spoiler panel and the wing; and
 a retractable device which can be deployed from a retracted position to an extended position in which it restricts circulation of air around the trailing edge of the spoiler panel and into the void; and
a control system configured to detect or predict an increase in the lift of the wing and rotate the spoiler panel to its raised position in response to a detected or predicted increase in the lift of the wing in order to alleviate load on the wing.

The retractable device has the effect of reducing induced drag, and thus improves aerodynamic efficiency, by restricting circulation of air around the trailing edge of the spoiler panel and into the void.

Preferably, the control system further comprises an actuator which engages the spoiler panel and is configured to exert a force on the spoiler panel in order to rotate it to its raised position.

The retractable device may be attached to only the spoiler panel and not to the wing, or vice versa. However this may result in a gap between the device and the component to which it is not attached. Therefore more preferably the device is attached to both the spoiler panel and the wing when it is in both its retracted and extended positions.

The motive force for deploying the device may be provided by an actuator which is operable independently of the spoiler panel. However more preferably the motive force for deploying the retractable device is provided by the rotation of the spoiler panel. For instance the spoiler panel may pull up the device into its extended position.

The retractable device may comprise a set of two or more nested members which extend up with a telescopic motion during deployment. However more preferably the retractable device comprises one or more flow restriction members which rotate with respect to the wing and the spoiler panel during deployment of the retractable device. In this case then preferably each flow restriction member rotates about a pivot axis which is substantially parallel to the pivot axis of the spoiler panel.

The retractable device may consist of only a single panel which is pivotally attached to the wing at its bottom edge, and attached to the spoiler panel at its top edge by a sliding pivot (or vice versa). As the spoiler panel rotates up, it pulls the device up and the device rotates about its pivot to move to its extended position. Alternatively the device may comprise two or more flow restriction members which are pivotally attached to each other and unfold during deployment of the retractable device. The angle between the flow restriction members increases as they unfold, and preferably the range of movement of the retractable device is restricted so as to prevent the angle between the flow restriction members increasing above 180°.

The retractable device may comprise an upper flow restriction member which is pivotally attached to the spoiler panel; and a lower flow restriction member which is pivotally attached to the wing. Preferably the upper flow restriction member extends forwards from its point of pivotal attachment to the spoiler panel; and the lower flow restriction member also extends forwards from its point of pivotal attachment to the wing. Optionally the upper and lower flow restriction members may also be pivotally attached to each other, either directly or via one or more additional pivotally connected panels.

Typically the spoiler panel has an upper surface and a lower surface; and the retractable device is attached to the lower surface of the spoiler panel.

Typically the retractable device is attached to the spoiler panel closer to its trailing edge than to its leading edge, at least when the spoiler panel is in its raised position and the retractable device is in its extended position. This maximizes the volume of void which is screened by the device.

Typically the retractable device comprises one or more panels.

Optionally the retractable device may comprise one or more perforated or meshed flow restriction members.

Typically the wing has an upper surface and the spoiler panel lies substantially flush with the upper surface of the wing when it is in its lowered position.

A second aspect of the invention provides a method of alleviating load on an aircraft wing, the method comprising: detecting or predicting an increase in the lift of the wing; rotating a spoiler panel up from a lowered position to a raised position in response to the detection or prediction of an increase in the lift of the wing in order to alleviate load on the wing, thereby opening a void between the spoiler panel and the wing; deploying a retractable device from a retracted position to an extended position; and restricting circulation of air around the trailing edge of the spoiler panel and into the void with the retractable device.

BRIEF DESCRIPTION OF THE DRAWINGS

Embodiments of the invention will now be described with reference to the accompanying drawings, in which:

FIG. 4 is a side view of a spoiler assembly according to an embodiment of the invention in its deployed position;

FIG. 5 is a side view of the spoiler assembly in an intermediate position;

FIG. 6 is a side view of the spoiler assembly in its lowered position

DETAILED DESCRIPTION OF EMBODIMENT(S)

Figure 1:
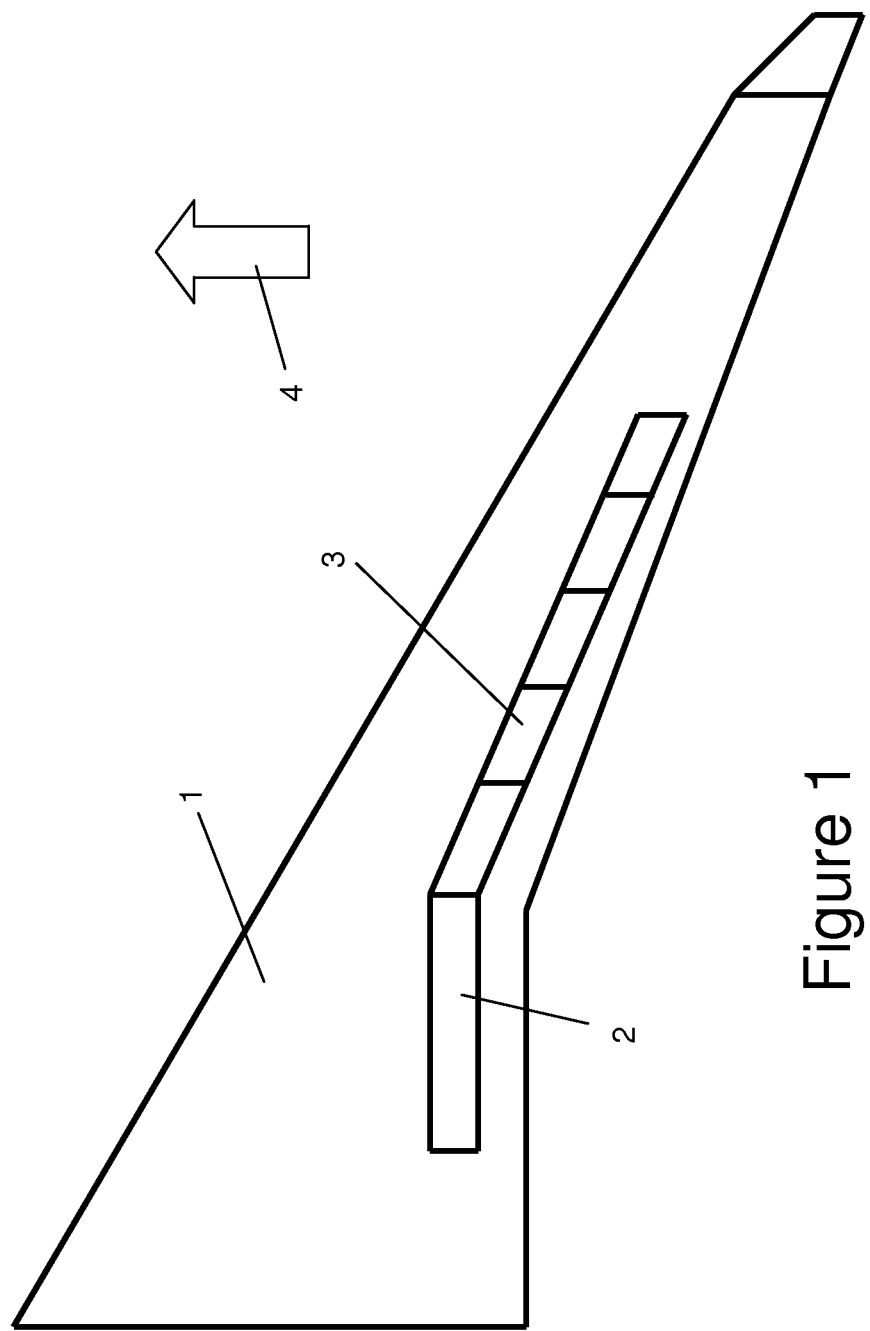
FIG. 1 is a plan view of a conventional spoiler layout for commercial aircraft.
Figure 2:
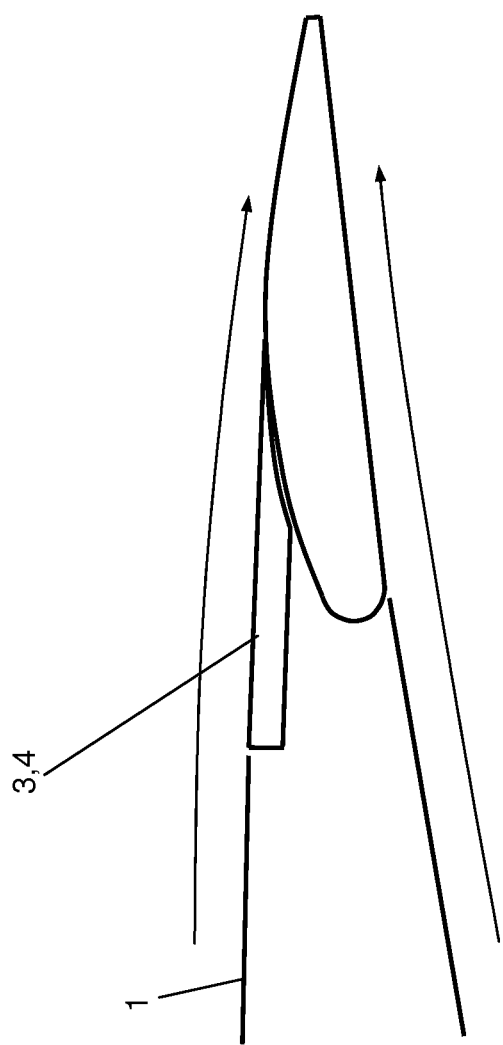
FIG. 2 is a side view of a conventional spoiler in its lowered position.
Figure 3:
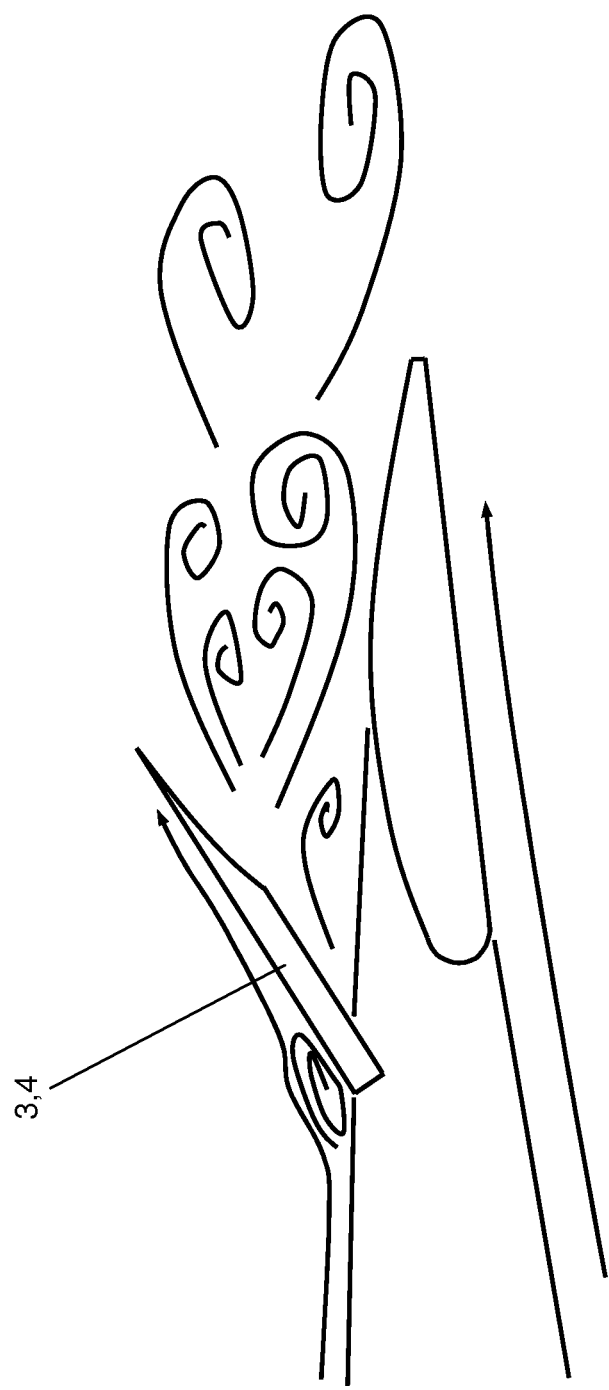
FIG. 3 is a side view of a conventional spoiler in a raised position.

FIGS. 4-7 show a wing/spoiler assembly. The assembly comprises a wing with an upper cover 5 and a lower cover 6 attached to a rear spar 7. A flap 12 is also pivotally mounted to the rear spar 7 and shown in its retracted (raised) position in FIGS. 4-7. Upper and lower trailing edge panels 8, 9 are mounted to the rear spar and extend to its rear. The trailing edge panels 8, 9 are also supported by trailing edge ribs (not shown) which are attached to and extended aft of the rear spar. A number of spoiler assemblies 13 are pivotally mounted to the trailing edge of the wing. Each spoiler assembly 13 comprises: a spoiler panel 14; a hydraulic actuator 15; and a pair of flow restriction panels 16, 17 which together form a retractable device for restricting circulation of air around a trailing edge of the spoiler panel. The actuator 15 comprises a piston 15a extending from a cylinder 15b. The piston 15a is pivotally connected to the spoiler panel 14 and the cylinder 15b is pivotally attached to the wing. Note that any suitable actuator may be employed in place of the hydraulic actuator, such as a linear or rotary electric actuator (not shown).

Figure 7:
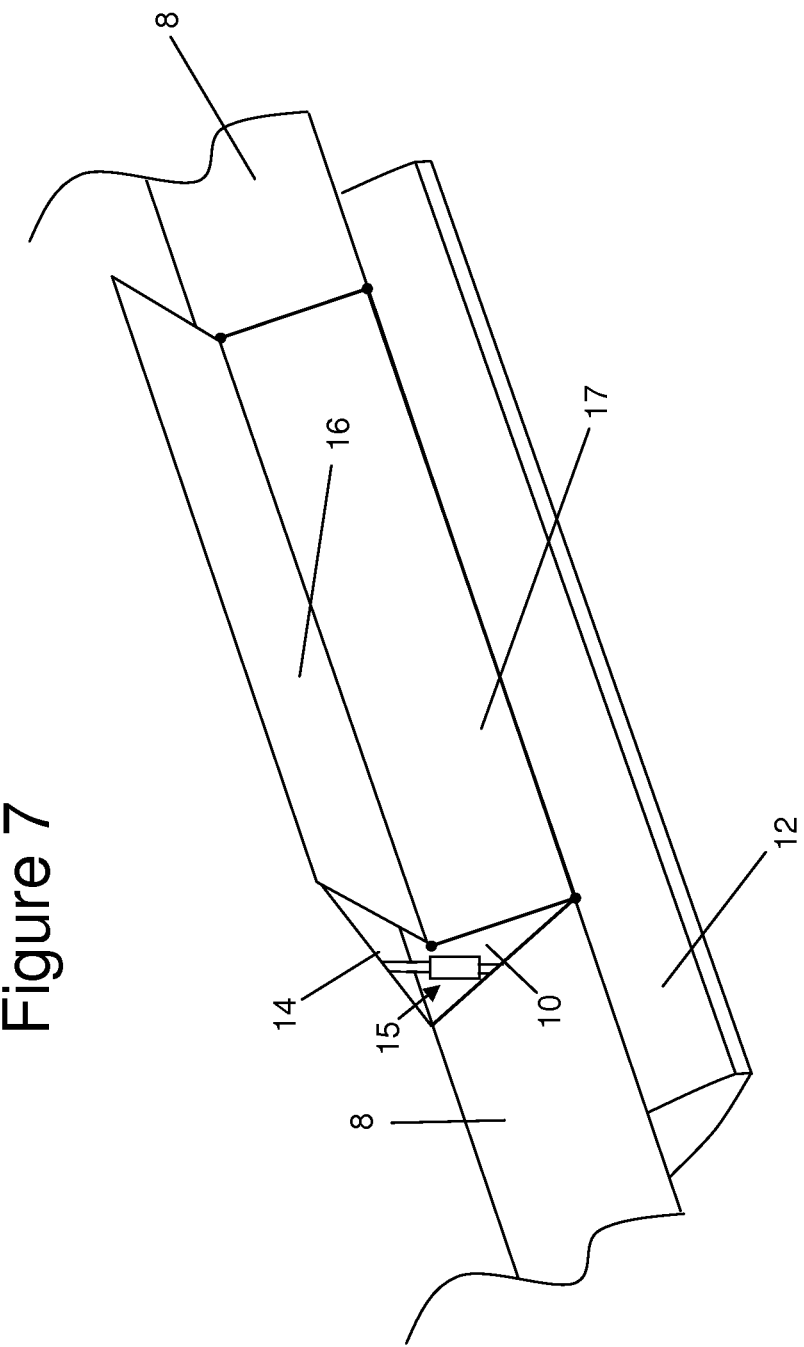
FIG. 7 is an isometric view of the spoiler assembly in its deployed position.

As shown in FIG. 7, the upper trailing edge panel 8 does not extend along the complete span-wise extent of the wing: specifically there is no upper trailing edge panel 8 in the area of the spoilers and flaps.

Conventionally no structure is present between the spoiler and the flap, but in this case the wing includes an attachment panel 10 which is attached at its forward edge to the rear spar; and at its inboard and outboard edges to an adjacent pair of trailing edge ribs (not shown).

The spoiler panel 14 has a leading edge 18 and a trailing edge 19, and the spoiler panel is pivotally attached to the rear spar proximate its leading edge 18. The spoiler actuator 15 can be energised to rotate the spoiler panel up from a lowered position shown in FIG. 6 to a raised position shown in FIGS. 4 and 7 via an intermediate position shown in FIG. 5. Similarly, when the spoiler panel is in its raised position, the spoiler actuator 15 can be energised to rotate the spoiler panel down from its raised position back to its lowered position via the intermediate position.

As shown in FIG. 5, when the spoiler is rotated to its raised position, a void 20 is opened up between the spoiler panel and the attachment panel 10. The upper face of the spoiler panel lies substantially flush with the upper face of the upper cover when it is in its lowered position as shown in FIG. 6. Note that the attachment panel 10 is recessed slightly below the upper cover 5 to provide space for the spoiler panel 14 and flow restriction panels 16, 17 when they are retracted. The upper flow restriction panel 16 is pivotally attached to the spoiler panel 14 proximate its trailing edge, and the lower flow restriction panel 17 is pivotally attached to the attachment panel 10. The flow restriction panels 16, 17 are also directly pivotally attached to each other.

Figure 8:
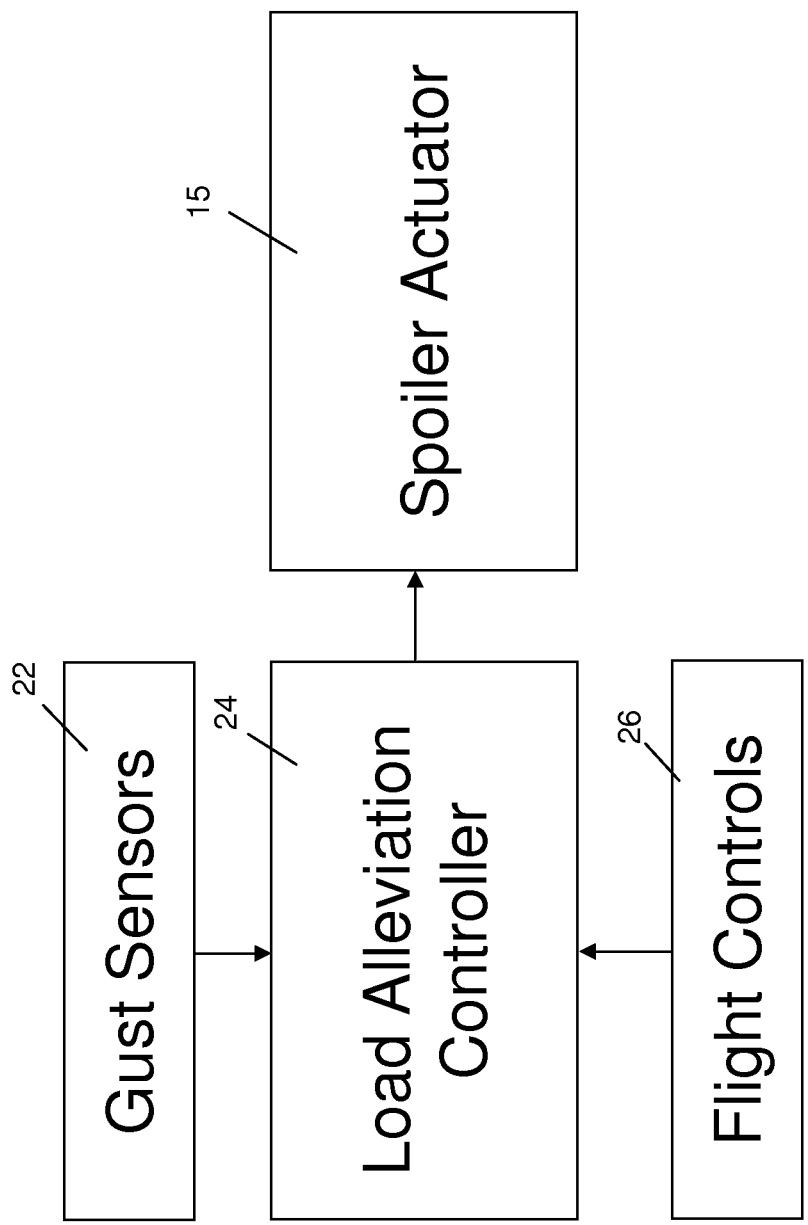
FIG. 8 is a block diagram of a load alleviation control system.

The block diagram of FIG. 8 shows a control system which is configured to detect or predict an increase in the lift of the wing and rotate the spoiler panel 14 to its raised position in response to a detected or predicted increase in the lift of the wing, thus alleviating load on the wing. More specifically, the wing comprises a set of gust sensors 22 which are configured to detect an increase in the lift of the wing caused by, for example, a gust of wind. The gust sensors 22 may comprise, for example, stress, load or accelerometer-based sensors. In the event that a gust is detected during flight, a signal is sent to a load alleviation controller 24. In response to the increase in the lift of the wing caused by the gust, the load alleviation controller 24 sends an actuation signal to the spoiler actuator 15 of one or more of the spoilers of one or both wings. The actuation signal causes the piston 15a of each spoiler actuator 15 to extend, thus exerting a force on each spoiler panel 14 in order to rotate it to its raised position. When the spoiler panel 14 is in its raised position, the lift of the wing decreases, thus minimising the increase in lift caused by the gust and minimising the associated bending moment at the wing root.

Certain manoeuvres, such as turning, also cause an increase in the lift of the wing. Therefore, when such a manoeuvre is executed, a flight control system 26 sends a control signal to the load alleviation controller 24. From this signal the load alleviation controller can predict that an increase in the lift of the wing is likely to occur. In response to such a prediction, the load alleviation controller 24 sends an actuation signal to the spoiler actuator(s) 15 of one or more of the spoilers on one or both wings. The actuation signal causes the piston 15a of the (or each) spoiler actuator to extend as before to exert a force on the spoiler panel(s), thus causing each panel to rotate to its raised position. As before, this causes the lift of the wing to decrease, thus minimising the increase in lift caused by the manoeuvre.

In both of the above cases, as each spoiler panel 14 is rotated up by the actuator 15 to its raised position, it pulls the flow restriction panels 16, 17 up so that they unfold in an accordion style from their retracted positions shown in FIG. 6 to their extended positions shown in FIG. 4. When in their extended positions the panels 15, 16 restrict circulation of air around the trailing edge of the spoiler panel and into the void 19 as shown in FIG. 4, thereby reducing induced drag. This allows the spoiler panel 14 to be rotated up to its raised position in order to alleviate load while minimising the increased drag induced by the spoiler panel 14.

The upper flow restriction panel 16 extends forwards from its point of pivotal attachment to the spoiler panel; and the lower flow restriction panel 16 also extends forwards from its point of pivotal attachment to the wing. This increases the compactness of the assembly since the panels 16, 17 are folded up and covered by the spoiler panel when the assembly is in its retracted position as shown in FIG. 6.

The angle 30 between the flow restriction panels increases as the retractable device unfolds from its retracted position to its extended position. The range of movement of the spoiler panel 14 (and hence the panels 16, 17) is restricted so as to prevent the angle 30 between the flow restriction panels increasing above the angle shown in FIG. 4. This prevents the panels 16, 17 from moving "over-centre" which could lock the assembly in its deployed position.

Although the invention has been described above with reference to one or more preferred embodiments, it will be appreciated that various changes or modifications may be made without departing from the scope of the invention as defined in the appended claims.

The invention claimed is:

1. An aircraft wing load alleviation system comprising:
   a wing;
   a spoiler assembly comprising:
      a spoiler panel having a trailing edge, the spoiler panel being pivotally attached to the wing so that the spoiler panel can be rotated up from a lowered position to a raised position, thereby opening a void between the spoiler panel and the wing; and
      a retractable device which can be deployed from a retracted position to an extended position in which it restricts circulation of air around the trailing edge of the spoiler panel and into the void; and
   a control system configured to detect or predict an increase in the lift of the wing and rotate the spoiler panel to its raised position in response to a detected or predicted increase in the lift of the wing in order to alleviate load on the wing.

2. The system of claim 1 wherein the control system comprises an actuator which engages the spoiler panel and is configured to exert a force on the spoiler panel in order to rotate it to its raised position.

3. The system of claim 1 wherein the retractable device is attached to the spoiler panel and to the wing when it is in its retracted and extended positions.

4. The system of claim 3 wherein the motive force for deploying the retractable device is provided by the rotation of the spoiler panel.

5. The system of claim 1 wherein the retractable device comprises one or more flow restriction members which rotate with respect to the wing and the spoiler panel during deployment of the retractable device.

6. The system of claim 5 wherein the retractable device comprises two or more flow restriction members which are pivotally attached to each other and unfold during deployment of the retractable device.

7. The system of claim 6 wherein the angle between the flow restriction members increases as they unfold; and wherein the range of movement of the retractable device is restricted so as to prevent the angle between the flow restriction members increasing above 180°.

8. The system of claim 1 wherein the retractable device comprises an upper flow restriction member which is pivotally attached to the spoiler panel; and a lower flow restriction member which is pivotally attached to the wing.

9. The system of claim 8 wherein the upper flow restriction member extends forwards from its point of pivotal attachment to the spoiler panel; and the lower flow restriction member extends forwards from its point of pivotal attachment to the wing.

10. The system of claim 8 wherein the upper and lower flow restriction members are pivotally attached to each other.

11. The system of claim 1 wherein the spoiler panel has an upper surface and a lower surface; and wherein the retractable device is attached to the lower surface of the spoiler panel.

12. The system of claim 1 wherein the spoiler panel has a leading edge; and wherein the retractable device is attached to the spoiler panel closer to its trailing edge than to its leading edge, at least when the spoiler panel is in its raised position and the retractable device is in its extend position.

13. The system of claim 1 wherein the retractable device comprises one or more panels.

14. The system of claim 1 wherein the retractable device comprises one or more perforated or meshed flow restriction members.

15. The system of claim 1 wherein the wing has an upper surface and wherein the spoiler panel lies substantially flush with the upper surface of the wing when it is in its lowered position.

16. A method of alleviating load on an aircraft wing, the method comprising:
   detecting or predicting an increase in the lift of the wing;
      rotating a spoiler panel up from a lowered position to a raised position in response to the detection or prediction of an increase in the lift of the wing in order to alleviate load on the wing, thereby opening a void between the spoiler panel and the wing; deploying a retractable device from a retracted position to an extended position; and restricting circulation of air around the trailing edge of the spoiler panel and into the void with the retractable device.

* * * * *